(12) United States Patent
McGuire

(10) Patent No.: US 6,941,073 B2
(45) Date of Patent: Sep. 6, 2005

(54) EAST-WEST SEPARABLE ROADM

(75) Inventor: James P. McGuire, Pasadena, CA (US)

(73) Assignee: Optical Research Associates, Pasadena, CA (US)

( * ) Notice: Subject to any disclaimer, the term of this patent is extended or adjusted under 35 U.S.C. 154(b) by 186 days.

(21) Appl. No.: 10/625,970

(22) Filed: Jul. 23, 2003

(65) Prior Publication Data

US 2004/0136718 A1 Jul. 15, 2004

Related U.S. Application Data

(60) Provisional application No. 60/397,944, filed on Jul. 23, 2002.

(51) Int. Cl.[7] .............................................. H04J 14/02
(52) U.S. Cl. .......................... 398/84; 398/83; 398/86; 398/87; 398/88; 398/96
(58) Field of Search ...................... 398/82–84, 86–88, 398/96; 385/37, 39, 47, 17, 18; 359/634, 722

(56) References Cited

U.S. PATENT DOCUMENTS

| | | | |
|---|---|---|---|
| 4,244,045 A | 1/1981 | Nosu et al. | |
| 4,482,994 A | 11/1984 | Ishikawa | |
| 4,768,849 A | 9/1988 | Hicks, Jr. | |
| 5,040,169 A | 8/1991 | Guerin et al. | |
| 5,414,540 A | 5/1995 | Patel et al. | |
| 5,652,814 A | 7/1997 | Pan et al. | |
| 5,745,271 A | 4/1998 | Ford et al. | |
| 5,786,915 A | 7/1998 | Scobey | |
| 5,822,095 A | 10/1998 | Taga et al. | |
| 5,859,717 A | 1/1999 | Scobey et al. | |
| 5,912,748 A | 6/1999 | Wu et al. | |
| 5,943,454 A | 8/1999 | Aksyuk et al. | |
| 5,960,133 A | 9/1999 | Tomlinson | |
| 6,185,023 B1 | 2/2001 | Mizrahi | |
| 6,198,857 B1 | 3/2001 | Grasis et al. | |
| 6,204,946 B1 | 3/2001 | Aksyuk et al. | |
| 6,208,442 B1 | 3/2001 | Liu et al. | |
| 6,212,312 B1 | 4/2001 | Grann et al. | |
| 6,285,500 B1 | 9/2001 | Ranalli et al. | |
| 6,285,810 B1 | 9/2001 | Fincato et al. | |
| 6,289,145 B1 * | 9/2001 | Solgaard et al. ............ | 385/17 |
| 6,320,996 B1 | 11/2001 | Scobey et al. | |
| 6,327,019 B1 | 12/2001 | Patel et al. | |
| 6,351,581 B1 | 2/2002 | Doerr et al. | |
| 6,407,839 B1 | 6/2002 | Cao | |

(Continued)

FOREIGN PATENT DOCUMENTS

| | | |
|---|---|---|
| EP | 1001287 A2 | 5/2000 |
| EP | 1298467 A1 | 4/2003 |
| WO | WO 01/07947 A1 | 2/2001 |
| WO | WO 01/37021 A1 | 5/2001 |
| WO | WO 01/46731 A2 | 6/2001 |
| WO | WO 02/25358 A2 | 3/2002 |
| WO | WO 02/079832 A1 | 10/2002 |

OTHER PUBLICATIONS

Scobey et al., Hybrid thin film WDM and optical switch devices for optical add/drop, OCLI Telecommunications Division, 3 pp.

*Primary Examiner*—Leslie Pascal
*Assistant Examiner*—Dalzid Singh
(74) *Attorney, Agent, or Firm*—Christie, Parker & Hale, LLP

(57) ABSTRACT

An East-West separable ROADM particularly usable as a programmable N×M optical add/drop multiplexer with an efficient pass through of optical channels in a multi-wavelength communication system. The East-West separable ROADM uses a grating that separates multi-channel optical signals into a plurality of optical channels, and combines a plurality of optical channels into multi-channel optical signals. Programmable mirrors and beam steerers can direct each optical channel to any of a plurality of fibers coupled to the device.

25 Claims, 9 Drawing Sheets

U.S. PATENT DOCUMENTS

| | | |
|---|---|---|
| 6,434,291 B1 * | 8/2002 | Kessler et al. ................ 385/24 |
| 6,498,872 B2 | 12/2002 | Bouevitch et al. |
| 6,501,877 B1 | 12/2002 | Weverka et al. |
| 6,535,664 B1 | 3/2003 | Anderson |
| 6,542,657 B2 | 4/2003 | Anderson |
| 6,549,699 B2 | 4/2003 | Belser et al. |
| 6,636,654 B2 | 10/2003 | McGuire, Jr. |
| 2001/0009596 A1 | 7/2001 | Solgaard et al |
| 2001/0052980 A1 | 12/2001 | Tada |
| 2002/0076146 A1 | 6/2002 | Iyer et al. |
| 2002/0131698 A1 | 9/2002 | Wilde |
| 2002/0196493 A1 | 12/2002 | Marom |
| 2002/0196494 A1 | 12/2002 | McGuire Jr. |
| 2002/0196520 A1 | 12/2002 | Marom et al. |
| 2002/0197000 A1 | 12/2002 | Marom |
| 2003/0012486 A1 | 1/2003 | Ducellier et al. |
| 2003/0053749 A1 | 3/2003 | Weverka et al. |

* cited by examiner

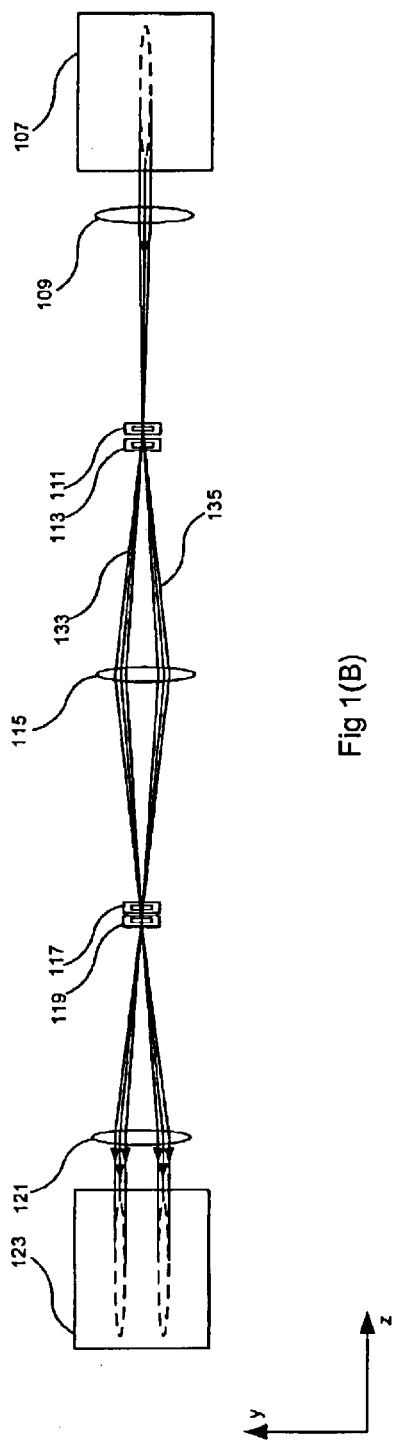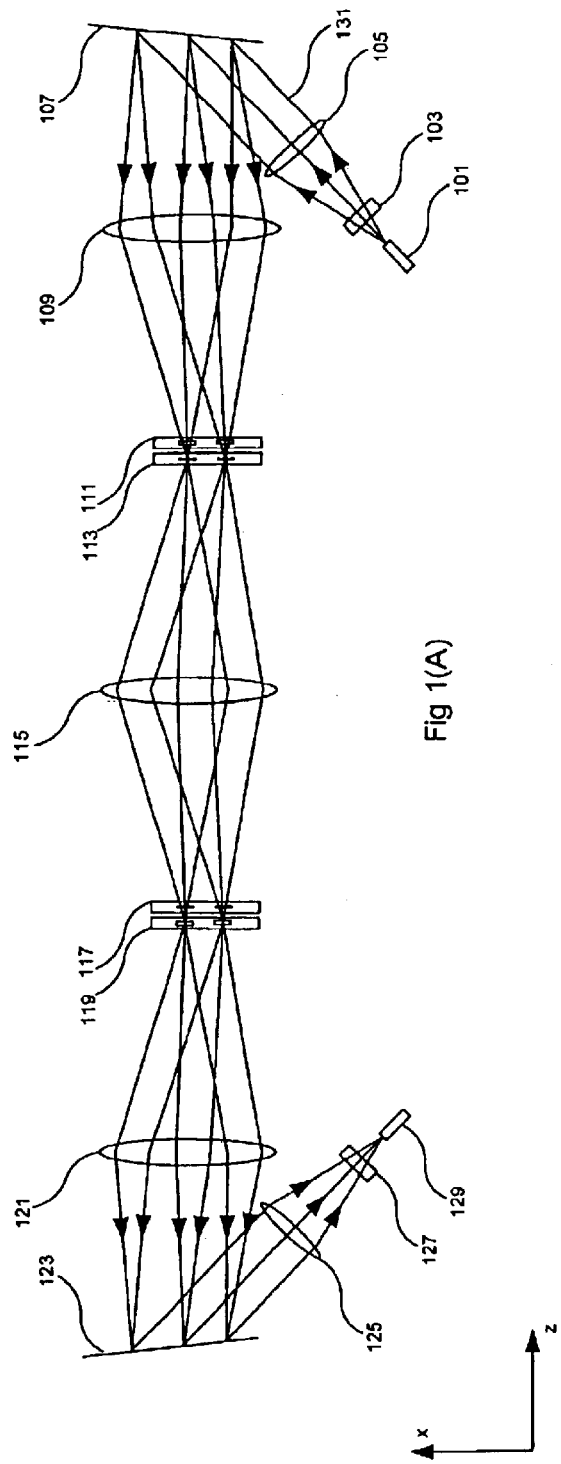
Fig 1(B)
Fig 1(A)

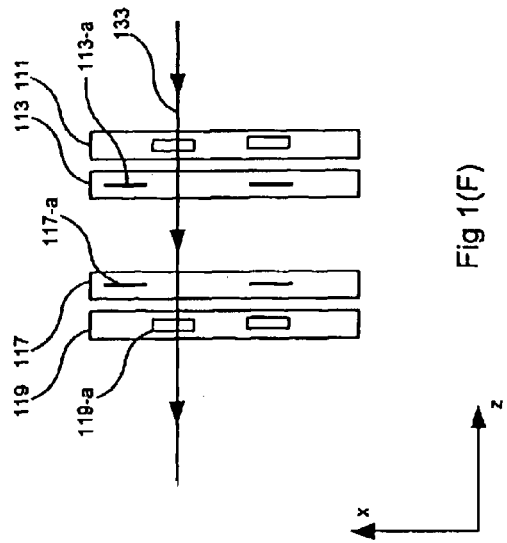
Fig 1(E)
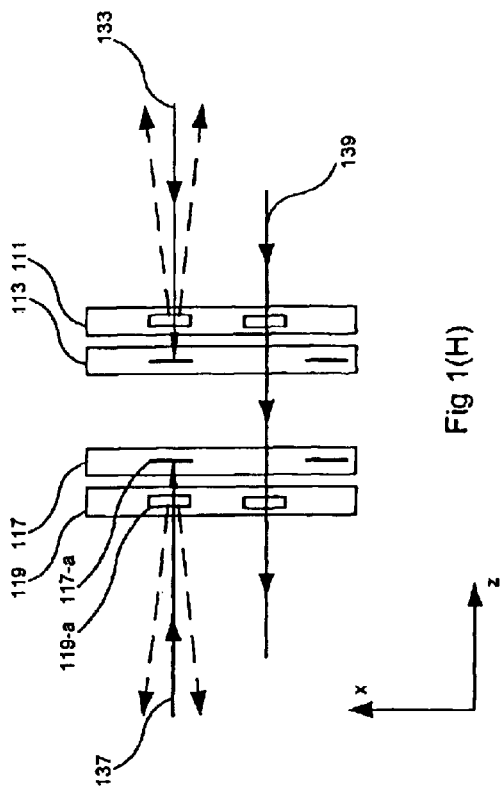
Fig 1(F)
Fig 1(H)
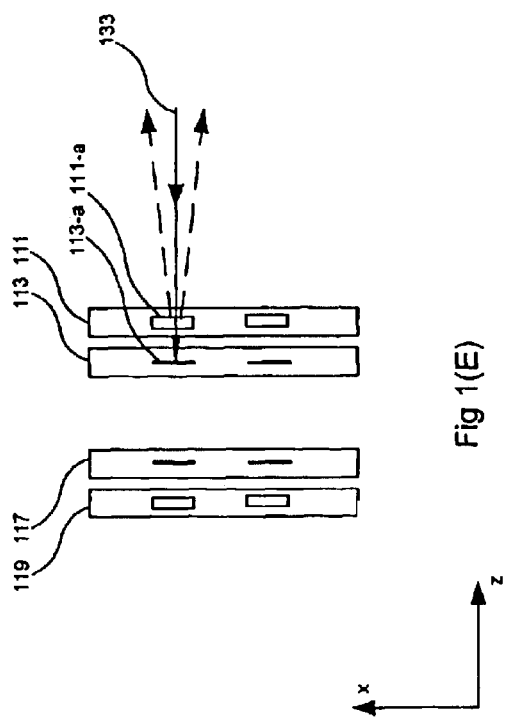
Fig 1(G)
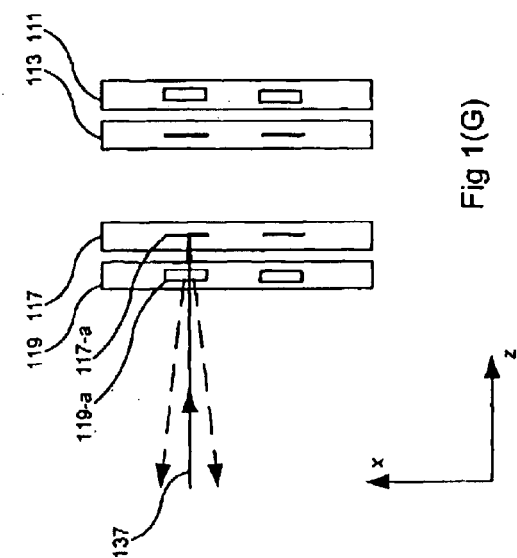

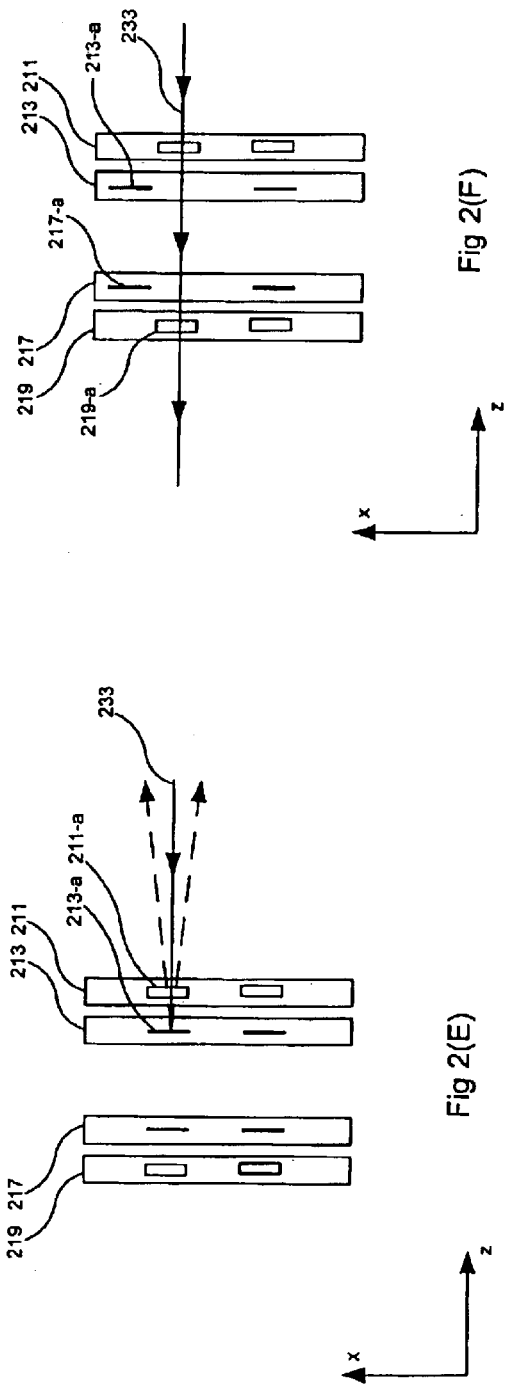
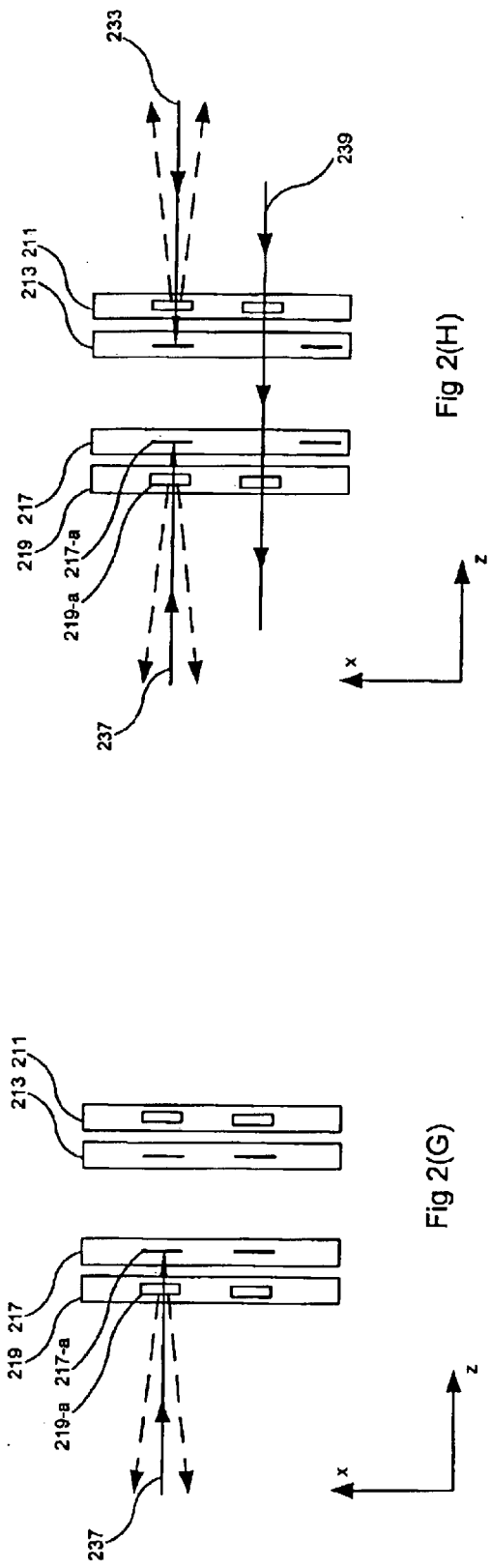
Fig 2(E)
Fig 2(F)
Fig 2(G)
Fig 2(H)

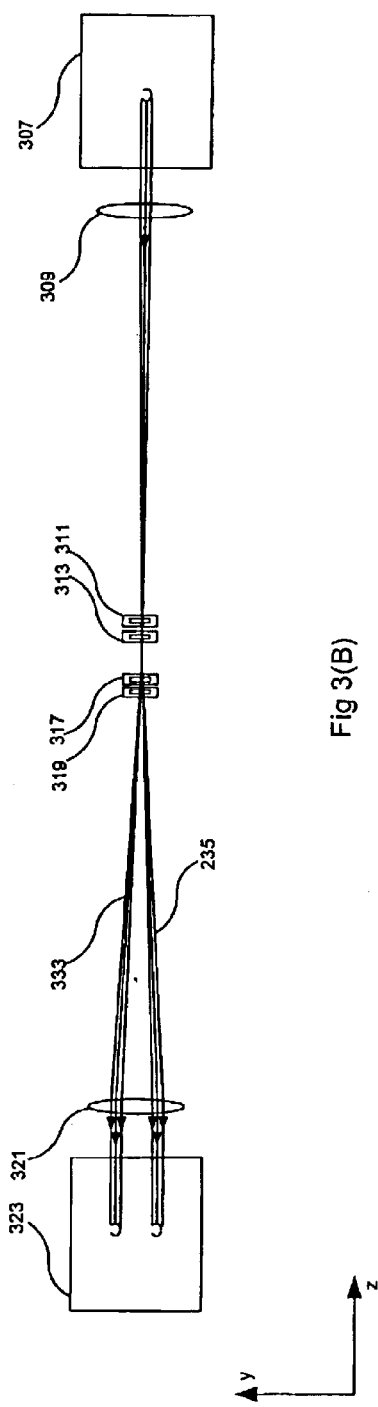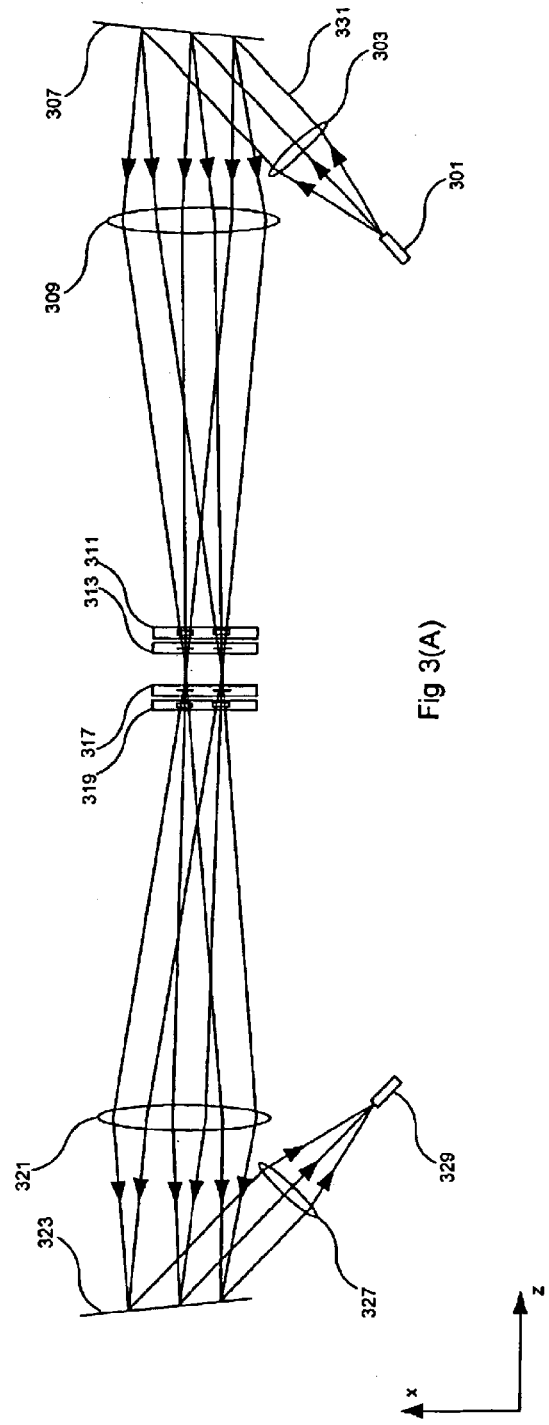

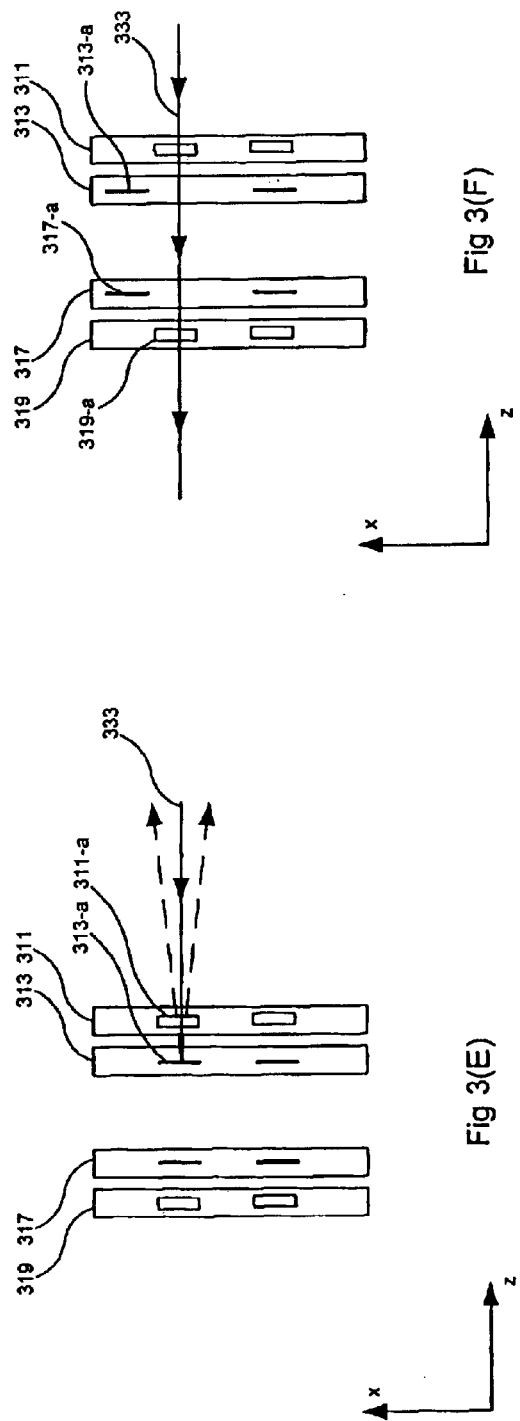
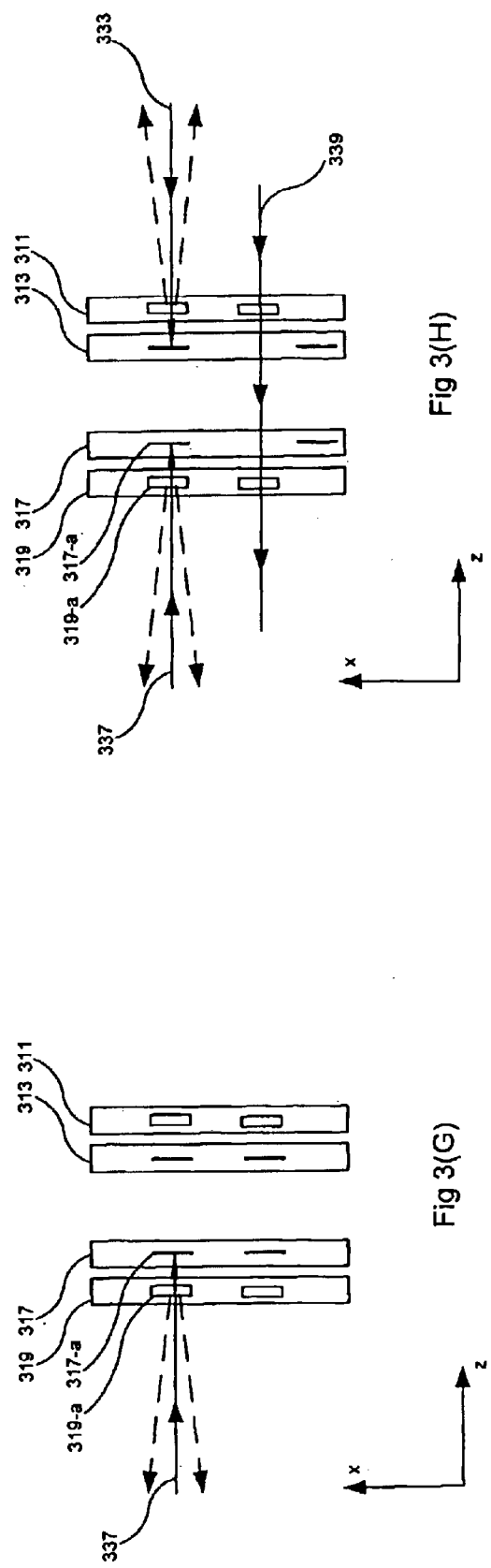
Fig 3(E)
Fig 3(F)
Fig 3(G)
Fig 3(H)

EAST-WEST SEPARABLE ROADM

RELATED APPLICATION

This application claims the benefit of U.S. Provisional Application No. 60/397,944 filed Jul. 23, 2002, the disclosure of which is incorporated fully herein by reference.

BACKGROUND OF THE INVENTION

This invention relates to the field of optical communications, and more particularly, to an East-West separable Reconfigurable Optical Add/Drop Multiplexer (ROADM) for use in optical communications systems.

For several decades, fiber optics have been used for communication. Specifically, fiber optics are used for data transmission and other telecommunication applications. Despite the enormous information carrying capacity of fiber, as compared to conventional copper cable, the high cost of installing fiber optics presents a barrier to full implementation of fiber optics, particular as the "last mile", from the central office to residences and businesses.

One common method used for optical communications is a synchronous optical network (SONET). SONET networks are often comprised of optical rings with interconnecting nodes attaching to the ring. In common SONET networks, a bi-directional line-switch ring is used for interconnection. There are two types of BLSRs: 2-fiber and 4-fiber. In a 4-fiber BLSR, the protection and working channels are over different physical fibers (lines). In a 2-fiber BLSR, half of the bandwidth on each of the two fibers is reserved for protection. In the 2-fiber BLSR, the protection mechanism used to protect against failures is the ring switch. In the 4-fiber BLSR, two protection mechanisms may be used to protect against failures: ring switch and span switch.

In a SONET network East/West Separability means that no single failure or repair can interrupt traffic to or from more than one direction. Hence all failures and repairs must either be protected through 1+1 equipment redundancy or have the same impact on traffic as a fiber or cable cut, which can be protected against by conventional 1:1 or 1+1 protection schemes. Add/Drop traffic failures may have the same impact as a single transmitter or receiver failure.

One method of increasing carrying capacity without incurring additional installation costs has been to multiplex multiple signals onto a single fiber using various methods, such as time division multiplexing, where two or more different signals are carried over the same fiber, each sharing a portion of time. Another more preferred multiplexing method is wavelength division multiplexing (WDM), where two or more different wavelengths of light are simultaneously carried over a common fiber.

Wavelength division multiplexing can separate a fiber's bandwidth into multiple channels. Dividing bandwidth into multiple discreet channels, such as 8, 16, 40, or even as many as 160 channels, through a technique referred to as dense channel wavelength division multiplexing (DWDM), is a relatively lower cost method of substantially increasing telecommunication capacity, using existing fiber optic transmission lines. Techniques and devices are required, however, for multiplexing the different discreet carrier wavelengths. That is, the individual optical signals must be combined onto a common fiber-optic line or other optical waveguide and then later separated again into the individual signals or channels at the opposite end or other point along the fiber-optic cable. Thus, the ability to effectively combine and then separate individual wavelengths (or wavelength sub-ranges) is of growing importance to the fiber-optic telecommunications field and other fields employing optical instruments.

Optical multiplexers are known for use in spectroscopic analysis equipment and for the combination or separation of optical signals in wavelength division multiplexed fiber-optic telecommunications systems. Known devices for this purpose have employed, for example, diffraction gratings, prisms and various types of fixed or tunable filters.

Approaches for selectively removing or tapping a channel, i.e., selective wavelengths, from a main trunk line carrying multiple channels, i.e., carrying optical signals on a plurality of wavelengths or wavelength sub-ranges, is suggested, for example, in U.S. Pat. No. 4,768,849 to Hicks, Jr. Hicks, shows filter taps, as well as the use of gangs of individual filter taps, each employing high performance, multi-cavity dielectric pass-band filters and lenses for sequentially removing a series of wavelength sub-ranges or channels from a main trunk line. The filter tap of Hicks, returns a multi-channel signal to the main trunk line as it passes the desired channel to a branch line. One known demux is disclosed in Pan et al., U.S. Pat. No. 5,652,814, FIG. 25. In Pan et al., the WDM input signal is cascaded through individual filter assemblies, consisting of a fiber collimator, thin film filter, and a fiber-focusing lens. Each filter is set for a given wavelength. However, aligning the fibers for each wavelength is costly and errors in the alignment contribute significantly to the system losses. Further, FIG. 13 of Pan et al. teaches the use of a dual fiber collimator, thin film filter, and a dual fiber focusing lens to selectively DROP and ADD a single wavelength or range of wavelengths. As discussed above, aligning the collimators is expensive.

Polarization dependent loss (PDL) is also a problem in WDM system because the polarization of the light drifts as it propagates through the fiber and furthermore this drift changes overtime. Thus, if there is PDL in any component, the drifting polarization will change the signal level, which may degrade the system operation.

Other multiplexer devices may be employed to add or drop channels in WDM systems. These systems are commonly known as optical add/drop multiplexers, or OADM. Another OADM, disclosed by Mizrahi in U.S. Pat. No. 6,185,023, employs fiber Bragg gratings to demux and mux signals in a WDM system. This method requires optical circulators and multiple components.

However, the multi channel OADM designs discussed above are not programmable by the end user. That is, each multiplexer is designed and manufactured to mux (add) specific channels; or when used in reverse each multiplexers is also designed and manufactured to demux (drop) specific channels. This limitation mandates that the optical system's parameters be fixed before installation. Changes are not possible without replacing the fixed optical multiplexers with different designed multiplexers. This is expensive.

One known programmable ROADM is discussed in Boisset et al, International Publication No. WO01/13151. In Boisset et al., the desired add/drop channel is programmed by translating a segmented filter. To achieve this translation however, a large mechanical mechanism is employed. A further limitation to Boisset et al. is that only a single channel may be added or dropped per device. Designers may employ multiple devices, deployed in series, and programmed as necessary to add/drop the correct channel; however, this approach requires multiple devices and has multiple points of failure. Furthermore, the size of such a device would be overly large and therefore not practical for many applications where space is limited. This ROADM is not East-West separable.

An OADM disclosed by Patel et al., U.S. Pat. No. 5,414,540 uses bulk gratings to demultiplex and multiplex WDM input and output signal and compact liquid crystal switches. Because the device uses polarization to switch the light path, the arbitrarily polarized incident beam must be converted into a singular polarization prior to switching by the liquid crystal. Patel teaches the use of a birefringent crystal and a Wollaston prism to separate the incident beam into two polarizations state located between the focusing lens and the liquid crystal. While the OADM disclosed by Patel is relatively compact; it only provides 2×2 switching for each wavelength. There is an Input and Add channel that may be selectively sent to either the Output or Drop channel. If higher dimensionality switching is required, then additional components are required. The additional components require additional space, add attenuation, and add cost to the system. A 2×2 switch has four sub beams incident on the liquid crystal (because of the conversion from an arbitrary polarized beam to a single polarization for the liquid crystal switch) and four sub beams leaving the liquid crystal. Thus, the aperture of the lens focusing the light on the grating must be a minimum of 4× larger than that required for a single sub beam in one polarization. This ROADM is not East-West separable.

An ROADM disclosed by Ranalli et al., U.S. Pat. No. 6,285,500, that uses bulk gratings to demultiplex and multiplex WDM input and output signal and compact liquid crystal switches. Because the device uses polarization to switch the light path, the arbitrarily polarized incident beam must be converted into a singular polarization prior to switching by the liquid crystal. Ranalli teaches the use of half-wave plates and a thin film polarization beamsplitter located before the lens that focuses light onto the liquid crystal. Because of the optical arrangement, the aperture of the lens focusing the light on the grating must be a minimum of 2× larger than that required for a single sub beam in one polarization. While the OADM disclosed by Ranalli is relatively compact; it only provides 2×2 switching for each wavelength. There is an Input and Add channel that may be selectively sent to either the Output or Drop channel. If higher dimensionality switching is required, then additional components are required. The additional components require additional space, add attenuation, and add cost to the system. This ROADM is not East-West separable.

A OADM disclosed by Patel et al., U.S. Pat. No. 6,327,019, uses bulk gratings to demultiplex and multiplex WDM input and output signal and compact liquid crystal switches. The OADM disclosed by Patel provides for dual 2×2 switching for each wavelength. There are two Input and two Add channels that may be selectively sent to either the two Output or two Drop channels. If higher dimensionality switching is required, then additional components are required. The additional components require additional space, add attenuation, and add cost to the system. Because liquid crystals use polarization to switch the light path, the arbitrarily polarized incident beam must be converted into a singular polarization prior to switching, which doubles the required aperture of the lens. Thus, the dual 2×2 switch has eight sub beams incident on the liquid crystal and eight sub beams leaving the liquid crystal. Thus, the aperture of the lens focusing the light on the grating must be a minimum of 8× larger than the aperture required for single incident beam in one polarization.

An ROADM disclosed by Aksyuk, et al, U.S. Pat. No. 6,204,946 uses a bulk grating to demultiplex and multiplex WDM input and output signal and Micro Electrical Mechanical Systems (MEMS) to provide the switching. This is another relatively compact switch, but it only provides 2×2 switching for each wavelength. There is an Input and Add channel that may be selectively sent to either the Output or Drop channel. If higher dimensionality switching is required, then additional components are required. The additional components require additional space, add attenuation, and add cost to the system. Because Aksyuk uses circulators to separate the Input and Add channels from the Output and Drop channels, the aperture of the lens focusing the light on the grating must be a minimum of 2× larger than the of a single incident beam. This ROADM is not East-West separable.

Another known programmable OADM is discussed Tomlinson, U.S. Pat. No. 5,960,133, uses a bulk gratings to demultiplex and multiplex WDM input and output signal, and MEMS mirrors to switch. The OADM disclosed by Tomlinson is programmable and provides for dual 2×2 switching. Tomlinson teaches a switch that does not require the use of circulators, potentially increasing the system efficiency. However, the aperture of the lens focusing the light on the grating must be a minimum of $(1+\sqrt{2})\times$ larger than the of a single incident beam for a 2×2 switch. Furthermore, for a dual 2×2 without circulators, the aperture of the lens focusing the light on the grating must be a minimum of $\sqrt{10}\times$ larger than that of a single incident beam. Thus, the size and expense of the focusing lens required grows quickly when moving from a single to dual switching. This ROADM is not East-West separable.

A programmable optical multiplexer/demultiplexer, disclosed by Marom et al, in U.S. Pat. App. Ser. No. 02/0196520, independently assigns every input optical channel in a signal to depart from any desired output port, which provides the functionality of 1×N switching for every wavelength. Marom teaches the use of a bulk grating to multiplex/demultiplex WDM input and output signal, and MEMS mirrors to switch. The demultiplexer device can also be operated in the reverse direction, and thus achieve programmable optical multiplexer functionality. However, the size and expense of the lens required by the demultiplexer also grows linearly with port count. A 1×5 port programmable optical multiplexer/demultiplexer requires a lens to focus light on the MEMs mirrors with an aperture at least 5× as large as that of a single incident beam.

Optical gratings are a periodic structure, which diffract light according to the wavelength. They can be used in either reflection or transmission. Gratings can be produce by modulating the surface height of a substrate or by modulating the index of refraction of a structure.

The spectral resolving power, $R=\lambda/\Delta\lambda$, of a grating is a measure of its ability to separate adjacent spectral lines, where $\lambda$ is average wavelength of a line and $\Delta\lambda$ is the limit of resolution. The theoretical resolving power is:

$$R=N\, d\, \cos\Gamma(\sin\alpha+\sin\beta)/\lambda$$

where N is the number of groves, d is the groove spacing, $\beta$ is the angle between the incident light path and the plane perpendicular to the groves, $\alpha$ is the angle of incidence on the grating and $\beta$ is the angle of diffraction. If the grating is planar and the groove spacing is uniform, then the resolving power is proportional to the ruled with of the grating, N d. Spectral resolving power is an important design parameter; the greater the resolving power the greater the optical separation between channels, and ultimately the channels a grating-based system can accommodate. For low-loss transmission of OC-768 channels and a channel spacing of 100 GHz, it is preferred that the resolution be 20 GHz or finer.

Of course, a larger grating can be employed to increase the spectral resolving power, however, that requires a combination of more physical space and faster or longer focal length lenses that are more expensive. Another approach has been to decrease the spacing of the grating grooves, d. However, the maximum theoretical efficiency of the grating decreases for small groove separations. When the separations between the grooves spacing is comparable to the wavelength of light, it is possible to get gratings that operate with high efficiency (>90%) for any incident polarization state. As the groove spacing approaches half the wavelength of light, it is possible to get high efficiency for only light polarized parallel to the grooves. For even smaller grooves separations, it is not possible to get high efficiency in either polarization state. Thus, there is a practical limit to increasing spectral resolving power through decreased grating groove separations. The relationship between grating efficiency, polarization, and groove shape is well known in the art and described in Diffraction Grating Handbook, Ch. 9, 4th Ed, Richardson Grating Laboratory, C. Palmer, (2000), which is hereby incorporated by reference. Each bulk diffraction grating device requires a minimum number of grating grooves to achieve a given spectral resolution. The minimum size is determined by the optical configuration of the device and the grating parameters.

In cases where one or more channels are selectively removed or tapped at a node, as discussed above, channels that are not removed are often passed through the node and multiplexed back onto the main trunk line. One conventional method for passing a channel is to convert the channel sent in the optical domain to the electrical domain, and then to simply retransmit the signal onto the main trunk line at each node. Typically, the conversion required only allows the add/drop system to be operable for a particular protocol, at one particular speed, and for a certain number of wavelengths.

Several methods for optically directing passed through channels are currently practiced in East-West separable ROADM. Each node is connected to the main trunk line via two add/drop multiplexers, the first configured at the receiving side of the node, and the second at the transmitting side of the node. In one method all of the system's optical channels are first demultiplexed and each directed to a 1×2 optical switch. Depending on the programmed state of the 1×2 switch, the channels are either dropped or passed. Passed channels are directed to a 2×1 optical switch (the first input connects to the output of the 1×2 switch and the second is connected to an add port). The 2×1 optical switch is then connected to the add/drop multiplexer on the transmit side of the node. In this manner each channel that is transmitted onto the main trunk line (those that are passed as well as those that are added) are multiplexed by the add/drop multiplexer at the transmit side of the node. This method requires each add/drop multiplexer have as many ports as channels, and additionally requires two 1×2 switches for each channels. These additional components, and required ports make this method impractical for larger channel systems.

A second method currently practiced for optically directing passed through channels in an East-West separable ROADM connects each node to the main trunk line via two add/drop multiplexers, the first configured at the receiving side of the node, and the second at the transmitting side of the node. Waverka et-al teaches one such device in WO 01/37021, which is fully incorporated by reference herein.

Passing of optical channels is achieved by first demultiplexing all the channels at the node's receiver-side add/drop multiplexer, then multiplexing the passed channels together at the receiver-side add/drop multiplexer and directing the multiplexed passed channels to the transmitter-side add/drop multiplexer. The passed channels are then demultiplexed, and any added channels are then multiplexed together with the passed channels and sent back onto the main truck line. While this method provides full programmability at the node and reduces the system components, the passed channels must be demultiplexed, multiplexed, demultiplexed, and multiplexed, thereby reducing the optical power of each channel.

The ability to switch to a number of optical ports in wavelength switches introduces another limiting design factor. In order to switch to a number of physical ports the size of the device must not only accommodate the space needed for the ports, but the optics must also direct the optical signals to those ports. As the number of ports increases the optical directing means (typically a moveable mirror) must be capable of directing the optical beams across a larger physical area where the optical ports are located. Also, as the optical beams must exit the ports within an acceptance angle so as to be coupled into the optical fiber, the ports must be physically located within a certain placement angle from the directing means. As the placement angle increases, the optical directing means generally becomes more expensive and the insertion loss increases. An additional lens may be used to focus the beam—however, this adds component cost and size to the device.

If the optical beams inside the device are made larger so as to increase spectral resolution the device size must increase, and in some cases larger lenses must be used. For example, an optical switch of the type disclosed by Marom et al. US 2002/0196520 A1, with one input port and four output ports (1×4) might be capable of switching 64 wavelengths spaced at 100 GHz. If the same design were used to switch 16 ports the grating and the grating aperture would likely need to be 4× larger to accommodate 100 GHz channels or if the grating was the same size, the system could switch 16 wavelength channels spaced at 400 GHz. The device disclosed by Marom cannot provide adequate spectral resolution for a large number of ports and a large number of wavelengths using small compact lenses that are easy to manufacture.

An optical wavelength switch disclosed by Waverka et al. WO 01/37021 uses a bulk diffraction grating and MEMS mirrors to provide 1×N switching. However, this design has a major drawback. Because the image is translated at the spectral focal plane by the MEMS mirrors, the incident angle on the grating changes with switch position, which in turn changes the angular dispersion provided by the grating. Thus, the device is unable to achieve adequate spectral resolution for a large number of ports and a large number of wavelengths with low losses. Waverka also teaches the use of cylindrical optics to produce an elliptical beam that minimizes the size of the grating. However, because the cylindrical optics are used symmetrically to both collimate light for the grating and to focus the light on the switch array, the footprint of the optical beam at the switch is a very high aspect ratio ellipse. Thus, very long thin, hard to fabricate switches are required.

SUMMARY OF THE INVENTION

In accordance with a first aspect of the invention, an East-West separable ROADM can establish a reconfigurable connection between any two fibers from a plurality of fibers in a first fiber array, independently for each optical wavelength that enters the switch, can establish a reconfigurable connection between any fiber in the first fiber and any fiber in a second fiber array independently for each optical wavelength that enters the switch, and can establish a reconfigurable connection between any two fibers from a plurality of fibers in the second fiber array, independently for each optical wavelength that enters the switch.

One of a plurality of first lenses receives a first multi-channel optical signal from an optically coupled fiber in the first fiber array. The first multi-channel optical signal is directed to a first grating. The first grating diffracts the first multi-channel optical signal according to the wavelengths of each individual optical channel, and directs each channel through a second lens that focuses the individual optical channels through one of a plurality of first beam steerers and near one of a plurality of first programmable mirrors. Each first beam steerer and first mirror are associated with a particular individual optical channel.

Depending upon the programmed state of the associated mirror (e.g., engaged or not engaged), the individual optical channel is either dropped to any one of the fibers in the first fiber array, or passed to an output fiber in the second fiber array. In the case where the individual optical channel is dropped, the associated mirror is engaged and the associated beam steerer may direct the individual optical channel to any one of the fibers in the first fiber array by way of the second lens, the first grating, and one of the plurality of first lenses.

In the case where the individual optical channel is passed, it does not reflect off the associated first mirror as it is not engaged, and is directed by the associated first beam steerer to a relay lens that focuses the individual optical channel through an associated second beam steerer and through a third lens which collimates the individual optical channel onto a second grating. The grating multiplexes the individual optical channel with other individual optical channels being added or passed, and diffracts the multiplexed signal to an output fiber in the second fiber array by way of one of a plurality of fourth lenses.

Similarly to dropping an individual optical channel, in the case where an individual optical channel is added, one of a plurality of fourth lenses receives an individual optical channel from one of the optically coupled fibers in the second fiber array. The individual optical channel is directed to the second grating. The second grating directs the individual optical channel through the third lens and through the associated second beam steerers and near the associated second programmable mirrors, which is engaged. The associated second beam steerers directs the individual optical channel to any one of the fibers in the second fiber array by way of the third lens, second grating which multiplexes the individual optical channel with other added or passed individual optical channels forming a second multi-channel optical signal and diffracts the second multi-channel optical signal through the one of the plurality of fourth lenses into the one of the fibers in the second fiber array.

In accordance with one aspect of the invention, the programmed state of the mirrors and beam steerers is such that an optical connection may be established at any place along the fiber array. In this regard, the device can be programmed to establish optical connectivity, for each optical channel, between any of the fibers in the array.

In accordance with several aspects two or more individual optical channels centered at the same wavelength are received from two or more fibers in the fiber array and are directed to other fibers in the array. However, the switching matrix is more restrictive as the same TBS and mirror are used for the direction of all the individual optical channels centered at the same wavelength. In this manner, each of the individual optical channels centered at the same wavelength are directed to the fiber in the fiber array that is opposite the TBS connection. For example, consider a nine port device coupled to a nine fiber array (the consecutive fibers numbered 1 through 9) which receives a first individual optical channel centered at wavelength x on port 1, and receives a second individual optical channel centered at wavelength x on port 2. If the corresponding beam steerer connection for wavelength x is set such that the light at wavelength x entering the switch from fiber 3 also leaves from fiber 3, then the first individual optical channel at wavelength x will be directed to fiber 5, and the second at wavelength x to fiber 4. In this manner, the device does not operate as an N×1×M switch, but still provides numerous switching options. Such options will be clear to one skilled in the art.

In accordance with several aspects of the invention, the plurality of first beam steerers and plurality of first programmable mirrors are closely arranged with the plurality of second beam steerers and plurality of second programmable mirrors. This aspect of the invention eliminates the relay lens and may reduce the size of the system.

In accordance with several aspects of the invention, the grating or gratings may operate at or near Littrow to increase the diffraction efficiency. In accordance with several aspects of the invention one or more transmission gratings may be employed.

In accordance with several aspects of the invention, the plurality of first lenses may be comprised of an array of first cylindrical lens elements, each coupled to a fiber in the first fiber array, and a first anamorphic lens. Similarly, the plurality of second lenses may be comprised of an array of second cylindrical lens elements, each coupled to a fiber in the second fiber array, and a second anamorphic lens. Additionally, the relay lens may optionally be comprised of an anamorphic lens element.

In accordance with several aspects of the invention, Volume Holographic Gratings with 1100 grooves/mm made on a substrate with low coefficient of thermal expansion, such as fused silica, are employed. Because these grating have poor efficiency in the p-polarization, the s- and p-polarization are split. The p-polarization is rotated by 90°, so that it is s-polarized, and the s- and -p polarizations are sent through separate sets of identical optics. This technique of splitting the two polarizations and running each through an identical set of optics is known as polarization diversity. U.S. patent application titled Wavelength Selective Optical Switch, filed Jun. 12, 2003, Ser. No. 10/460,899, which is incorporated fully herein by reference.

It is an object of the present invention to provide improved optical switching, in combination with efficient pass through of optical channels, which reduce or wholly overcome some or all of the aforesaid difficulties inherent in prior known devices. Particular objects and advantages of the invention will be apparent to those skilled in the art, that is, those who are knowledgeable and experienced in this field of technology, in view of the following disclosure of the invention and detailed description of certain preferred embodiments.

Different aspects of the invention may also be employed together.

BRIEF DESCRIPTION

FIG. 1(A) is a first perspective view of a first embodiment of an East-West separable ROADM detailing the optical paths through the device.

FIG. 1(B) is a second perspective view of a first embodiment of an East-West separable ROADM detailing the optical paths through the device.

FIG. 1(E) is a perspective view of a first embodiment of an East-West separable ROADM detailing the optical paths for a dropped channel.

FIG. 1(F) is a perspective view of a first embodiment of an East-West separable ROADM detailing the optical paths for a passed channel.

FIG. 1(G) is a perspective view of a first embodiment of an East-West separable ROADM detailing the optical paths for an added channel.

FIG. 1(H) is a perspective view of a first embodiment of an East-West separable ROADM detailing the optical paths for a dropped channel, an added channel, and a passed channel.

FIG. 2(E) is a perspective view of a second embodiment of an East-West separable ROADM detailing the optical paths for a dropped channel.

FIG. 2(F) is a perspective view of a second embodiment of an East-West separable ROADM detailing the optical paths for a passed channel.

FIG. 2(G) is a perspective view of a second embodiment of an East-West separable ROADM detailing the optical paths for an added channel.

FIG. 2(H) is a perspective view of a second embodiment of an East-West separable ROADM detailing the optical paths for a dropped channel, an added channel, and a passed channel.

FIG. 3(A) is a first perspective view of a third embodiment of an East-West separable ROADM detailing the optical paths through the device.

FIG. 3(B) is a second perspective view of a third embodiment of an East-West separable ROADM detailing the optical paths through the device.

FIG. 3(E) is a perspective view of a third embodiment of an East-West separable ROADM detailing the optical paths for a dropped channel.

FIG. 3(F) is a perspective view of a third embodiment of an East-West separable ROADM detailing the optical paths for a passed channel.

FIG. 3(G) is a perspective view of a third embodiment of an East-West separable ROADM detailing the optical paths for an added channel.

FIG. 3(H) is a perspective view of a third embodiment of an East-West separable ROADM detailing the optical paths for a dropped channel, an added channel, and a passed channel.

DETAILED DESCRIPTION OF THE INVENTION

Figure 1D:
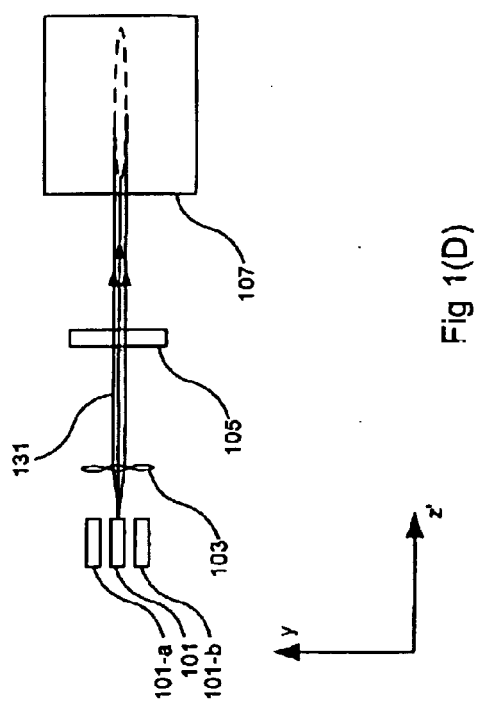
FIG. 1(D) is a fourth perspective view of a first embodiment of an East-West separable ROADM detailing the optical paths through the device.

An East-West separable ROADM has numerous applications, including use in fiber optic telecommunications systems. For purposes of illustration, the embodiments described below detail demultiplexing, switching, and multiplexing in multi-channel fiber optic telecommunication systems. Exemplary references to an optical channel, or simply to a channel, should be understood to mean an optical signal with a centered wavelength and an upper and lower wavelength. Channel spacing is measured from the center of the first channel to the center of an adjacent channel.

A two channel grating-based optical switch, employing one embodiment of the invention, is detailed in FIG. 1(A), FIG. 1(B), FIG. 1(C), and FIG. 1(D), FIG. 1(A), FIG. 1(B), FIG. 1(C), and FIG. 1(D) detail different views of the same device. It is of note that while only two channels are used in this example, a substantially larger number of channels and optical ports may be employed. The East-West separable ROADM allows for demultiplexing, multiplexing and switching separate optical channels to any one of a plurality of optical ports. The East-West separable ROADM of FIG. 1 may be dynamically programmed to demultiplex, multiplex and switch any combination of wavelengths to any of a plurality of optical ports.

A first embodiment of the East-West separable ROADM device of FIG. 1(A), FIG. 1(B), FIG. 1(C), and FIG. 1(D) comprises a First Cylindrical Lens Array 103 optically coupled to an Input Fiber 101 and to Drop Fibers 101-a and 101-b, a First Grating 107, a Second Lens 109, a First Array of Programmable Transmissive Beam Steerers (TBS) 111 optically coupled to a First Array of Programmable Mirrors 113, Anamorphic Relay Lens 115, a Second Array of Programmable Mirrors 117 optically coupled to a Second Array of Programmable TBS 119, a Third Lens 121, a Second Grating 123, a Second Anamorphic Lens 125, a Second Cylindrical Lens Array 127 optically coupled to an Output Fiber 129 and to an Add Fiber 129-a and an Add Fiber 129-b.

The aforementioned lenses may be comprised of multiple lens elements. It is well known in the art that lenses may be comprised of multiple lens elements to achieve a particular optical performance. A cylindrical lens has at least one surface that is formed like a portion of a cylinder, defined by:

$$z(x)=cx^2/\{1+\text{Sqrt}[1-(1+k)c^2 x\ ^2]\}+Ax^4+Bx^6+Cx^8+DX^{10}$$

where z(x) is the sag, c is the curvature at the pole of the surface, x is the distance from the center of the lens along the x-axis, k is the conic constant, and A, B, C, D are aspheric coefficients. Note that in this case that sag is independent of the y-coordinate. An anamorphic lens, usually having one more cylindrical surface, has a different magnification along mutually perpendicular meridians.

The device of FIG. 1 may be mounted within an enclosure optimized for optical transmission, including a gas-filled enclosure, or the like.

The First Array of programmable TBS 111 and the Second Array of programmable TBS 119 are responsible for steering optical signals. One aspect of the present invention employs liquid crystal TBS. Cassarly et-al teaches one such liquid crystal TBS device in U.S. Pat. No. 5,107,357, which is fully incorporated by reference herein. In addition, whichever means is employed for steering the optical signals may also steer the optical signals in more than one axis. This permits, among other things, the steering of optical signals from one port to another port without directing the optical signal to a third port. This allows one port in the system to be steered to another port without interfering with any other ports that might be in use at the time. It will be clear to one skilled in the art that beam steering devices may be used in any of the described embodiments.

A prism may optionally be used in any embodiment of the system. Temperature changes cause grating to expand and contract. As gratings expand and contract the wavelength-sized gradations that cause diffraction increase and decrease causing a change in the diffraction angle from a grating. As the temperature changes, the refractive index of the prism changes, which in turn, changes the dispersion of the prism. Accordingly, a prism may be used to balance the thermal affects on the First and Second Gratings 107 and 123. When the prism and gratings are properly designed and configured the effects of temperature on the system are greatly reduced. However, some embodiments of the system do not contain a prism.

A multi-channel light signal 131 enters the device through the Input Fiber 101, and is directed through one of the Cylindrical Lenses on the First Cylindrical Lens Array 103. The Cylindrical Lens on the First Cylindrical Lens Array 103 collimates the multi-channel light signal 131 and directs it through the First Anamorphic Lens 105. When beam size is large, the geometrical limit holds and all the rays are parallel in a collimated beam. As the beam size decreases, diffraction becomes important and it is preferable to locate the beam waist at the First Grating 107. The First Anamorphic Lens 105 collimates and focuses the multi-channel light signal 131 and directs it onto First Grating 107. The cylindrical and anamorphic lenses produce a beam with an elliptical footprint on the First Grating 107. The major axis of the ellipse is perpendicular to the grooves so that the spectral resolution is maximized, while the overall size of the grating is less than that if a conventional relay collimating lens were used.

First Grating 107 diffracts the individual Channels 133 and 135 of the multi-channel light signal 131 (hereafter channels) towards the Second Lens 109. The Second Lens 109 is preferably telecentric, so that the central ray, or chief ray, of each channel is parallel at the First TBS 111 plane. This minimizes the tilt required of the First TBS 111. In a telecentric lens, the aperture stop is located at the front focus of the lens, resulting in the exit pupil being at infinity. The Second Lens 109 focuses the Channels 133 and 135, in both the x-axis and y-axis, near the First Array of Programmable Mirrors 113. More specifically, Second Lens 109 focuses Channel 133 near the Programmable Mirror associated with Channel 133, and focuses channel 135 near the Programmable Mirror associated with channel 135. By focusing the channels in both the x-axis and y-axis, the optical beam size is reduced and the size of the First TBS 111 may be reduced.

Depending upon the programmed state of the TBS 111 and the programmed state of the First Array of Programmable Mirrors 113, each channel received may dropped or passed. For example, turning to FIG. 1(E), if channel 133 is to be dropped, the corresponding Channel Mirror 113-a on the First Array of Programmable Mirrors 113 is engaged thereby reflecting channel back toward the First Grating 107. The programmed state of TBS 111-a directs the channel to either Drop Fiber 101-a or to Drop Fiber 101-b shown in FIG. 1(D).

Turning to FIG. 1(F), if channel 133 is to be passed, the corresponding Channel Mirror 113-a on the First Array of Programmable Mirrors 113 and the corresponding Channel Mirror 117-a on the Second Array of Programmable Mirrors 117 are disengaged thereby passing the channel toward the Second Grating 123. The programmed state of TBS 111-a and TBS 119-a directs the channel to Output Fiber 129. In this regard, each the channel is transmitted through the Anamorphic Relay Lens 115 which focuses the channel in both the x-axis and y-axis toward the Second Array of Programmable Mirrors 117. As Channel Mirror 117-a is disengaged, the channel is passed to the Third Lens 121 which collimates the channel onto Second Grating 123. Second Grating 123 multiplexes the channel with any other passed channels and added channels and diffracts the resulting beam toward Second Anamorphic Lens 125 and Second Cylindrical Lens Array 127 into Output Fiber 129.

Figure 1C:
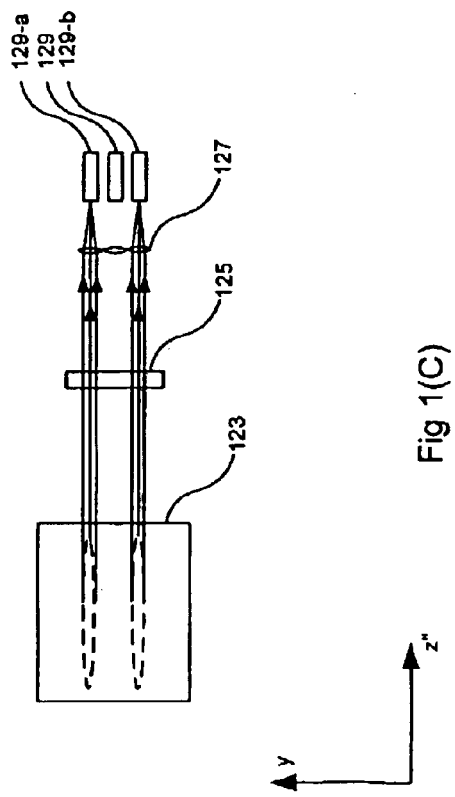
FIG. 1(C) is a third perspective view of a first embodiment of an East-West separable ROADM detailing the optical paths through the device.

Turning to FIG. 1(G), if Channel 137 entering the system from Add Fiber 129-a or Add Fiber 129-b shown in FIG. 1(C) is to be added, the corresponding Channel Mirror 117-a on the Second Array of Programmable Mirrors 117 is engaged thereby reflecting channel back toward the Second Grating 123. The programmed state of TBS 119-a directs Channel 137 so as to be multiplexed with the other channels added and passed and into Output Fiber 129.

Turning to FIG. 1(H), it will be clear to one skilled in the art each channel may be independently added, dropped, or passed. As depicted, Channel 133 is being dropped, whereas Channel is being added, and Channel 139 is being passed.

A two channel grating-based optical switch, employing one embodiment of the invention, is detailed in FIG. 2(A), FIG. 2(B), FIG. 2(C), and FIG. 2(D), FIG. 2(A), FIG. 2(B), FIG. 2(C), and FIG. 2(D) detail different views of the same device. It is of note that while only two channels are used in this example, a substantially larger number of channels and optical ports may be employed. The East-West separable ROADM allows for demultiplexing, multiplexing and switching separate optical channels to any one of a plurality of optical ports. The East-West separable ROADM of FIG. 2 may be dynamically programmed to demultiplex, multiplex and switch any combination of wavelengths to any of a plurality of optical ports.

A second embodiment of the East-West separable ROADM device of FIG. 2(A), FIG. 2(B), FIG. 2(C), and FIG. 2(D) comprises a First Lens Array 203 optically coupled to an Input Fiber 201 and to Drop Fibers 201-a and 201-b, a First Grating 207, a Second Lens 209, a First Array of programmable Transmissive Beam Steerers (TBS) 211 optically coupled to a First Array of Programmable Mirrors 213, Relay Lens 215, a Second Array of Programmable Mirrors 217 optically coupled to a Second Array of programmable TBS 219, a Third Lens 221, a Second Grating 223, an Fourth Lens Array 227 optically coupled to an Output Fiber 229 and to an Add Fiber 229-a and an Add Fiber 229-b.

The aforementioned lenses may be comprised of multiple lens elements. It is well known in the art that lenses may be comprised of multiple lens elements to achieve a particular optical performance.

The device of FIG. 2 may be mounted within an enclosure optimized for optical transmission, including a gas-filled enclosure, or the like.

The First Array of programmable TBS 211 and the Second Array of programmable TBS 219 are responsible for steering optical signals. One aspect of the present invention employs liquid crystal TBS. In addition, whichever means is employed for steering the optical signals may also steer the optical signals in more than one axis. This permits, among other things, the steering of optical signals from one port to another port without directing the optical signal to a third port. This allows one port in the system to be steered to another port without interfering with any other ports that might be in use at the time. It will be clear to one skilled in the art that beam steering devices may be used in any of the described embodiments.

A prism may optionally be used in any embodiment of the system. Temperature changes cause gratings to expand and contract. As gratings expand and contract the wavelength-sized gradations that cause diffraction increase and decrease causing a change in the diffraction angle from a grating. As the temperature changes, the refractive index of the prism changes, which in turn, changes the dispersion of the prism. Accordingly, a prism may be used to balance the thermal affects on the First and Second Gratings 207 and 223. When the prism and gratings are properly designed and configured the effects of temperature on the system are greatly reduced. However, some embodiments of the system do not contain a prism.

A multi-channel light signal 231 enters the device through the Input Fiber 201, and is directed through one of the lenses on the First Lens Array 203. The lens on the First Lens Array 203 collimates the multi-channel light signal 231 and directs it onto First Grating 207. The lens on the First Lens Array 203 produces a beam with a circular cross-section.

First Grating 207 diffracts the individual Channels 233 and 235 of the multi-channel light signal 231 (hereafter channels) towards the Second Lens 209. The Second Lens 209 is preferably telecentric, so that the central ray, or chief ray, of each channel is parallel at the First TBS 211 plane. This minimizes the tilt required of the First TBS 211. In a telecentric lens, the aperture stop is located at the front focus of the lens, resulting in the exit pupil being at infinity. The Second Lens 209 focuses the Channels 233 and 235, in both the x-axis and y-axis, near the First Array of Programmable Mirrors 213. More specifically, Second Lens 209 focuses Channel 233 near the Programmable Mirror associated with Channel 233, and focuses channel 235 near the Programmable Mirror associated with channel 235.

Depending upon the programmed state of the TBS 211 and the programmed state of the First Array of Programmable Mirrors 213, each channel received may dropped or passed. For example, turning to FIG. 2(E), if channel 233 is to be dropped, the corresponding Channel Mirror 213-a on the First Array of Programmable Mirrors 213 is engaged thereby reflecting channel back toward the First Grating 207. The programmed state of TBS 211-a directs the channel to either Drop Fiber 201-a or to Drop Fiber 201-b shown in FIG. 2(D).

Turning to FIG. 2(F), if channel 233 is to be passed, the corresponding Channel Mirror 213-a on the First Array of Programmable Mirrors 213 and the corresponding Channel Mirror 217-a on the Second Array of Programmable Mirrors 217 are disengaged thereby passing the channel toward the Second Grating 223. The programmed state of TBS 211-a and TBS 219-a directs the channel to Output Fiber 229. In this regard, each the channel is transmitted through the Relay Lens 215 which focuses the channel in both the x-axis and y-axis toward the Second Array of Programmable Mirrors 217. As Channel Mirror 217-a is disengaged, the channel is passed to the Third Lens 221 which collimates the channel onto Second Grating 223. Second Grating 223 multiplexes the channel with any other passed channels and added channels and diffracts the resulting beam towards Fourth Lens Array 227 into Output Fiber 229.

Figure 2B:
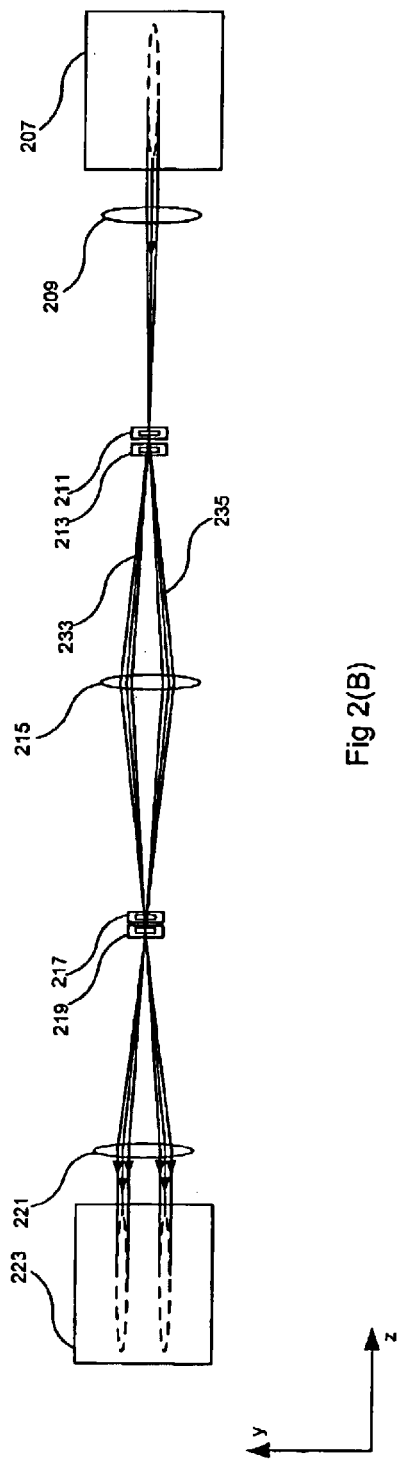
FIG. 2(B) is a second perspective view of a second embodiment of an East-West separable ROADM detailing the optical paths through the device.
Figure 2A:
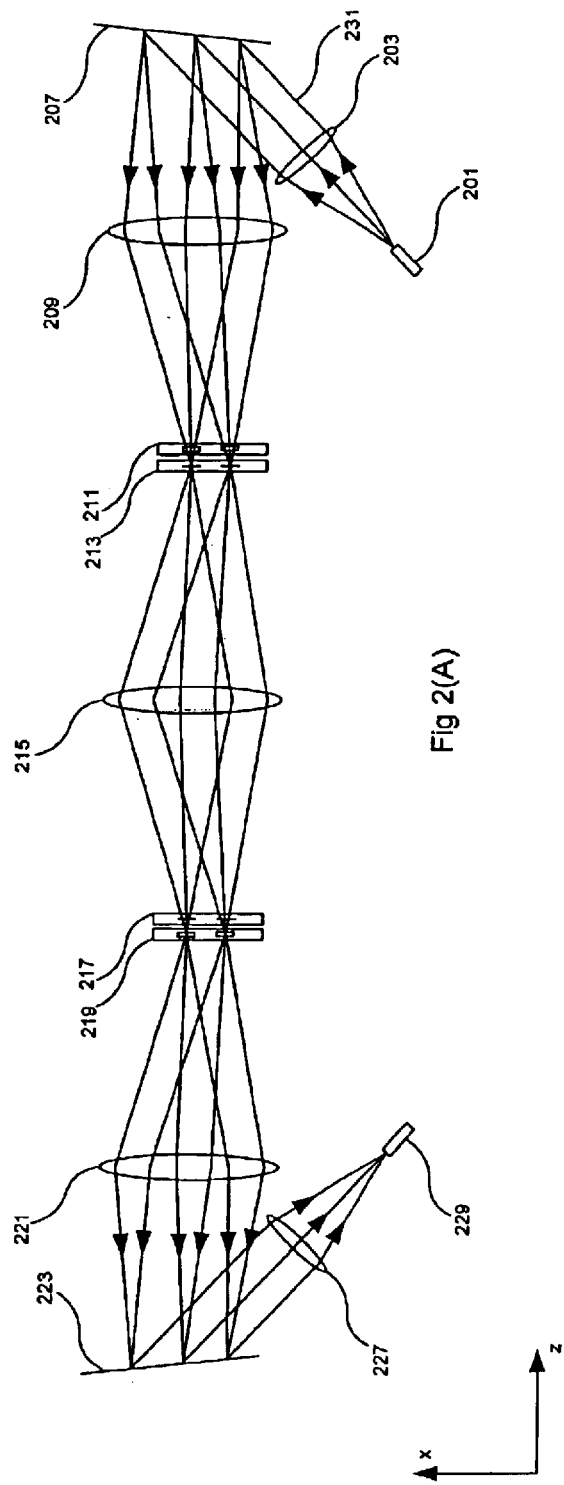
FIG. 2(A) is a second perspective view of a second embodiment of an East-West separable ROADM detailing the optical paths through the device.
Figure 2D:
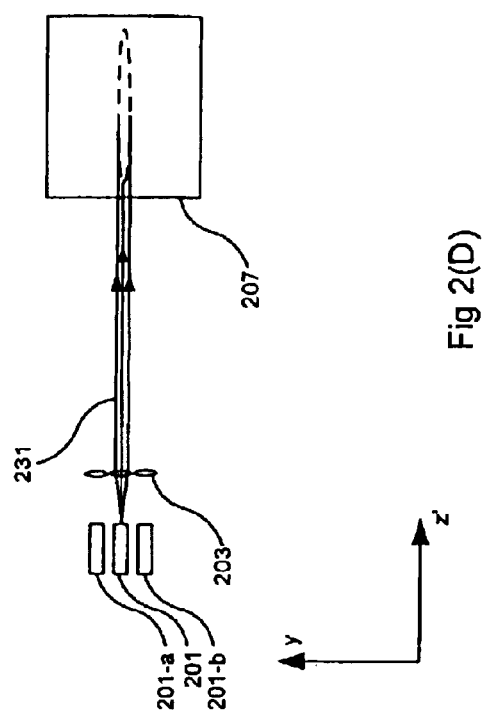
FIG. 2(D) is a fourth perspective view of a second embodiment of an East-West separable ROADM detailing the optical paths through the device.
Figure 2C:
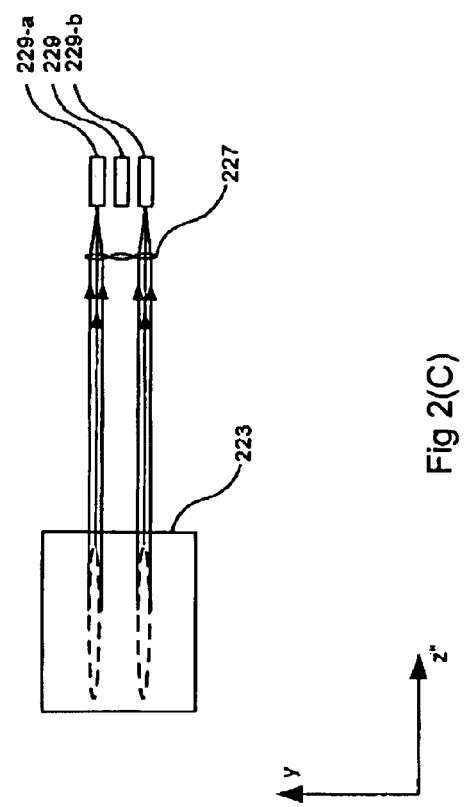
FIG. 2(C) is a third perspective view of a second embodiment of an East-West separable ROADM detailing the optical paths through the device.

Turning to FIG. 2(G), if Channel 237 entering the system from Add Fiber 229-a or Add Fiber 229-b shown in FIG. 2(C) is to be added, the corresponding Channel Mirror 217-a on the Second Array of Programmable Mirrors 217 is engaged thereby reflecting channel back toward the Second Grating 223. The programmed state of TBS 219-a directs Channel 237 so as to be multiplexed with the other channels added and passed and into Output Fiber 229.

Turning to FIG. 2(H), it will be clear to one skilled in the art each channel may be independently added, dropped, or passed. As depicted, Channel 233 is being dropped, whereas Channel is being added, and Channel 239 is being passed.

The optical configuration is such that the optical signals directed to and entering fibers are within the cone of acceptance thereby reducing system loss. It will be clear to one skilled in the art that any received channel may be either dropped to any drop fiber or passed via an output fiber. Similarly, a channel may be added via any of the add fibers. In this regard, the system may be scaled to accommodate both a large number of add and drop fibers, and a large number of channels.

It will be clear to one skilled in the art that the system may be operated in the opposite direction. For example, receiving an optical Channel 229 via Port 211-a, multiplexing it with one or more received optical channels, and directing the multiplexed optical signal via Port 201-a or 201-b.

A two channel grating-based optical switch, employing one embodiment of the invention, is detailed in FIG. 3(A), FIG. 3(B), FIG. 3(C), and FIG. 3(D), FIG. 3(A), FIG. 3(B), FIG. 3(C), and FIG. 3(D) detail different views of the same device. It is of note that while only two channels are used in this example, a substantially larger number of channels and optical ports may be employed. The East-West separable ROADM allows for demultiplexing, multiplexing and switching separate optical channels to any one of a plurality of optical ports. The East-West separable ROADM of FIG. 3 may be dynamically programmed to demultiplex, multiplex and switch any combination of wavelengths to any of a plurality of optical ports.

A second embodiment of the East-West separable ROADM device of FIG. 3(A), FIG. 3(B), FIG. 3(C), and FIG. 3(D) comprises a First Lens Array 303 optically coupled to an Input Fiber 301 and to Drop Fibers 301-a and 301-b, a First Grating 307, a Second Lens 309, a First Array of programmable Transmissive Beam Steerers (TBS) 311 optically coupled to a First Array of Programmable Mirrors 313, a Second Array of Programmable Mirrors 317 optically coupled to a Second Array of programmable TBS 319, a Third Lens 321, a Second Grating 323, an Fourth Lens Array 327 optically coupled to an Output Fiber 329 and to an Add Fiber 329-a and an Add Fiber 329-b.

The aforementioned lenses may be comprised of multiple lens elements. It is well known in the art that lenses may be comprised of multiple lens elements to achieve a particular optical performance.

The device of FIG. 3 may be mounted within an enclosure optimized for optical transmission, including a gas-filled enclosure, or the like.

The First Array of programmable TBS 311 and the Second Array of programmable TBS 319 are responsible for steering optical signals. One aspect of the present invention employs liquid crystal TBS. In addition, whichever means is employed for steering the optical signals may also steer the optical signals in more than one axis. This permits, among other things, the steering of optical signals from one port to another port without directing the optical signal to a third port. This allows one port in the system to be steered to another port without interfering with any other ports that might be in use at the time. It will be clear to one skilled in the art that beam steering devices may be used in any of the described embodiments.

A prism may optionally be used in any embodiment of the system. Temperature changes cause grating to expand and contract. As gratings expand and contract the wavelength-sized gradations that cause diffraction increase and decrease causing a change in the diffraction angle from a grating. As the temperature changes, the refractive index of the prism changes, which in turn, changes the dispersion of the prism. Accordingly, a prism may be used to balance the thermal affects on the First and Second Gratings 307 and 323. When the prism and gratings are properly designed and configured the effects of temperature on the system are greatly reduced. However, some embodiments of the system do not contain a prism.

A multi-channel light signal 331 enters the device through the Input Fiber 301, and is directed through one of the lenses on the First Lens Array 303. The lens on the First Lens Array 303 collimates the multi-channel light signal 331 and directs it onto First Grating 307. The lens on the First Lens Array 303 produces a beam with a circular footprint on the First Grating 307.

First Grating 307 diffracts the individual Channels 333 and 335 of the multi-channel light signal 331 (hereafter channels) towards the Second Lens 309. The Second Lens 309 is preferably telecentric, so that the central ray, or chief ray, of each channel is parallel at the First TBS 311 plane. This minimizes the tilt required of the First TBS 311. In a telecentric lens, the aperture stop is located at the front focus of the lens, resulting in the exit pupil being at infinity. The Second Lens 309 focuses the Channels 333 and 335, in both the x-axis and y-axis, midway between the First Array of Programmable Mirrors 313 and the Second Array of Programmable Mirror 317. More specifically, Second Lens 309 focuses Channel 333 midway between the Programmable Mirror associated with Channel 333 on the First and Array of Programmable Mirrors 313 and the Programmable Mirror associated with Channel 333 on the Second and Array of Programmable Mirrors 317, and focuses channel 335 midway between the Programmable Mirror associated with Channel 335 on the First and Array of Programmable Mirrors 313 and the Programmable Mirror associated with Channel 335 on the Second Array of Programmable Mirrors 317. By focusing the channels in both the x-axis and y-axis, the optical beam size is reduced and the size of the First TBS 311 may be reduced.

Depending upon the programmed state of the TBS 311 and the programmed state of the First Array of Programmable Mirrors 313, each channel received may dropped or passed. For example, turning to FIG. 3(E), if channel 333 is to be dropped, the corresponding Channel Mirror 313-a on the First Array of Programmable Mirrors 313 is engaged thereby reflecting channel back toward the First Grating 307. The programmed state of TBS 311-a directs the channel to either Drop Fiber 301-a or to Drop Fiber 301-b shown in FIG. 3(D).

Turning to FIG. 3(F), if channel 333 is to be passed, the corresponding Channel Mirror 313-a on the First Array of Programmable Mirrors 313 and the corresponding Channel Mirror 317-a on the Second Array of Programmable Mirrors 317 are disengaged thereby passing the channel toward the Second Grating 323. The programmed state of TBS 311-a and TBS 319-a directs the channel to Output Fiber 329. In this regard, each the channel is transmitted toward the Second Array of Programmable Mirrors 317. As Channel Mirror 317-a is disengaged, the channel is passed to the Third Lens 321 which collimates the channel onto Second Grating 323. Second Grating 323 multiplexes the channel with any other passed channels and added channels and diffracts the resulting beam towards Fourth Lens Array 327 into Output Fiber 329.

Figure 3D:
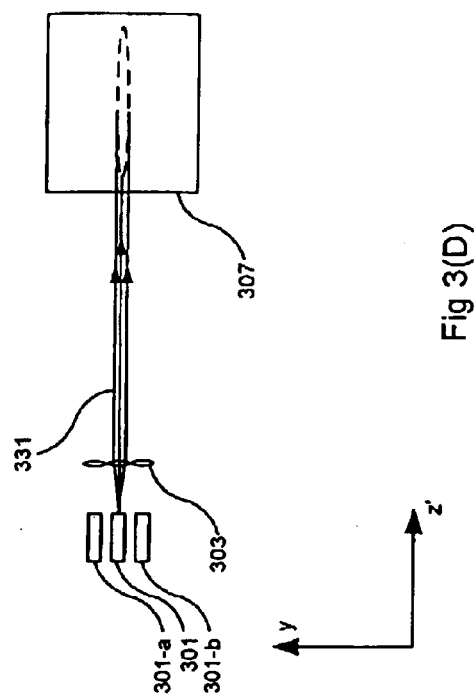
FIG. 3(D) is a fourth perspective view of a third embodiment of an East-West separable ROADM detailing the optical paths through the device.
Figure 3C:
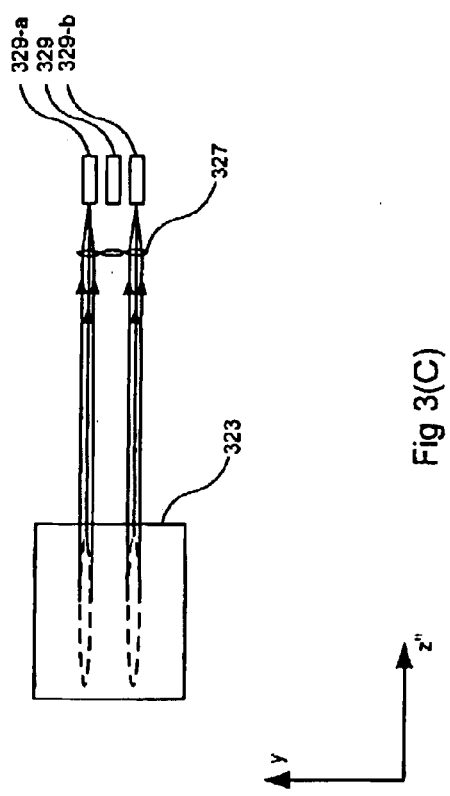
FIG. 3(C) is a third perspective view of a third embodiment of an East-West separable ROADM detailing the optical paths through the device.

Turning to FIG. 3(G), if Channel 337 entering the system from Add Fiber 329-a or Add Fiber 329-b shown in FIG. 3(C) is to be added, the corresponding Channel Mirror 317-a on the Second Array of Programmable Mirrors 317 is engaged thereby reflecting channel back toward the Second Grating 323. The programmed state of TBS 319-a directs Channel 337 so as to be multiplexed with the other channels added and passed and into Output Fiber 329.

Turning to FIG. 3(H), it will be clear to one skilled in the art each channel may be independently added, dropped, or passed. As depicted, Channel 333 is being dropped, whereas Channel is being added, and Channel 339 is being passed.

The optical configuration is such that the optical signals directed-to and entering fibers are-within the cone of acceptance thereby reducing system loss. It will be clear to one skilled in the art that any received channel may be either dropped to any drop fiber or passed via an output fiber. Similarly, a channel may be added via any of the add fibers. In this regard, the system may be scaled to accommodate both a large number of add and drop fibers, and a large number of channels.

It will be clear to one skilled in the art that the system may be operated in the opposite direction. For example, receiving an optical Channel 329 via Port 311-a, multiplexing it with one or more received optical channels, and directing the multiplexed optical signal via Port 301-a or 301-b.

What is claimed is:

1. A East-West separable Reconfigurable Optical Add/Drop Multiplexer, optically coupled to a plurality of fibers in a plurality of fiber arrays, the East-West separable ROADM comprising:

a plurality of first cylindrical lenses positioned to collimate in a first axis an optical signal provided by a corresponding optical fiber in a first fiber array forming a first axis collimated optical signal;

a second cylindrical lens positioned to collimate in a second axis the first axis collimated optical signal to form a first multi-axis collimated optical signal;

a first wavelength separating medium angularly diffracting light incident to the wavelength separating medium into a plurality of angularly diffracted light signals, the wavelength separating medium positioned to have incident thereon the multi-axis collimated optical signal;

a third lens positioned to focus the plurality of angularly diffracted light signals;

a first plurality of transmissive beam directors in a beam director array optically between the first wavelength separating medium and a first plurality of beam reflectors in a beam reflector array;

the first plurality of beam reflectors in the beam reflector array comprised of at least one beam reflector positionable to reflect at least some of the angularly diffracted light;

an anamorphic relay lens positioned to focus the plurality of angularly diffracted light signals;

a second plurality of transmissive beam directors in a beam director array optically between the second wavelength separating medium and a second plurality of beam reflectors in a beam reflector array;

the plurality of second beam reflectors in the beam reflector array comprised of at least one beam reflector positionable to reflect at least some of the angularly diffracted light;

a fourth lens positioned to collimate the plurality of angularly diffracted light signals into a second multi-axis collimated optical signal;

a second wavelength separating medium angularly diffracting light incident to the wavelength separating medium, the wavelength separating medium positioned to have incident thereon the second multi-axis collimated optical signal;

a fifth cylindrical lens positioned to focus in the second axis the second multi-axis collimated optical signal;

a plurality of sixth cylindrical lenses positioned to focus in the first axis the second multi-axis collimated optical signal.

2. The East-West separable Reconfigurable Optical Add/Drop Multiplexer of claim 1, wherein the first wavelength separating medium is a transmissive grating, and wherein the second wavelength separating medium is a transmissive grating.

3. The East-West separable Reconfigurable Optical Add/Drop Multiplexer of claim 2, wherein the first transmissive wavelength separating medium is operating near Littrow, and wherein the second transmissive wavelength separating medium is operating near Littrow.

4. The East-West separable Reconfigurable Optical Add/Drop Multiplexer of claim 1, wherein the first wavelength separating medium is a reflective grating, and wherein the second wavelength separating medium is a reflective grating.

5. The East-West separable Reconfigurable Optical Add/Drop Multiplexer of claim 4, wherein the first reflective wavelength separating medium is operating near Littrow, and wherein the second reflective wavelength separating medium is operating near Littrow.

6. The East-West separable Reconfigurable Optical Add/Drop Multiplexer of claim 1, wherein the plurality of transmissive beam directors in the first beam director array are positionable in two axes, and wherein the plurality of transmissive beam directors in the second beam director array are positionable in two axes.

7. The multi-channel optical switching system of claim 1, wherein the plurality of transmissive beam directors in the first beam director array are liquid crystal beam steerers, and wherein the plurality of transmissive beam directors in the second beam director array are liquid crystal beam steerers.

8. A East-West separable Reconfigurable Optical Add/Drop Multiplexer, optically coupled to a plurality of fibers in a plurality of fiber arrays, the East-West separable RECONFIGURABLE OPTICAL ADD/DROP MULTIPLEXER comprising:

a plurality of first lenses positioned to collimate in a first axis and a second axis an optical signal provided by a corresponding optical fiber in a first fiber array forming a first multi-axis collimated optical signal;

a first wavelength separating medium angularly diffracting light incident to the wavelength separating medium into a plurality of angularly diffracted light signals, the wavelength separating medium positioned to have incident thereon the multi-axis collimated optical signal;

a third lens positioned to focus the plurality of angularly diffracted light signals;

a first plurality of transmissive beam directors in a beam director array optically between the first wavelength separating medium and a first plurality of beam reflectors in a beam reflector array;

the first plurality of beam reflectors in the beam reflector array comprised of at least one beam reflector positionable to reflect at least some of the angularly diffracted light;

a relay lens positioned to focus the plurality of angularly diffracted light signals;

a second plurality of transmissive beam directors in a beam director array optically between the second wavelength separating medium and a second plurality of beam reflectors in a beam reflector array;

the plurality of second beam reflectors in the beam reflector array comprised of at least one beam reflector positionable to reflect at least some of the angularly diffracted light;

a fourth lens positioned to collimate the plurality of angularly diffracted light signals into a second multi-axis collimated optical signal;

a second wavelength separating medium angularly diffracting light incident to the wavelength separating medium, the wavelength separating medium positioned to have incident thereon the second multi-axis collimated optical signal;

a plurality of sixth cylindrical lenses positioned to focus in the first and the second axis the second multi-axis collimated optical signal.

9. The East-West separable Reconfigurable Optical Add/Drop Multiplexer of claim 8, wherein the relay lens is an anamorphic lens.

10. The East-West separable Reconfigurable Optical Add/Drop Multiplexer of claim 8, wherein the first wavelength separating medium is a transmissive grating, and wherein the second wavelength separating medium is a transmissive grating.

11. The East-West separable Reconfigurable Optical Add/Drop Multiplexer of claim 10, wherein the first transmissive wavelength separating medium is operating near Littrow, and wherein the second transmissive wavelength separating medium is operating near Littrow.

12. The East-West separable Reconfigurable Optical Add/Drop Multiplexer of claim 8, wherein the first wavelength separating medium is a reflective grating, and wherein the second wavelength separating medium is a reflective grating.

13. The East-West separable Reconfigurable Optical Add/Drop Multiplexer of claim 12, wherein the first reflective wavelength separating medium is operating near Littrow, and wherein the second reflective wavelength separating medium is operating near Littrow.

14. The East-West separable Reconfigurable Optical Add/Drop Multiplexer of claim 8, wherein the plurality of transmissive beam directors in the first beam director array are positionable in two axes, and wherein the plurality of transmissive beam directors in the second beam director array are positionable in two axes.

15. The multi-channel optical switching system of claim 8, wherein the plurality of transmissive beam directors in the first beam director array are liquid crystal beam steerers, and wherein the plurality of transmissive beam directors in the second beam director array are liquid crystal beam steerers.

16. A East-West separable Reconfigurable Optical Add/Drop Multiplexer, optically coupled to a plurality of fibers in a plurality of fiber arrays, the East-West separable ROADM comprising:

a plurality of first lenses positioned to collimate in a first axis and a second axis an optical signal provided by a corresponding optical fiber in a first fiber array forming a first multi-axis collimated optical signal;

a first wavelength separating medium angularly diffracting light incident to the wavelength separating medium into a plurality of angularly diffracted light signals, the wavelength separating medium positioned to have incident thereon the multi-axis collimated optical signal;

a third lens positioned to focus the plurality of angularly diffracted light signals;

a first plurality of transmissive beam directors in a beam director array optically between the first wavelength separating medium and a first plurality of beam reflectors in a beam reflector array;

the first plurality of beam reflectors in the beam reflector array comprised of at least one beam reflector positionable to reflect at least some of the angularly diffracted light;

a second plurality of transmissive beam directors in a beam director array optically between the second wavelength separating medium and a second plurality of beam reflectors in a beam reflector array;

the plurality of second beam reflectors in the beam reflector array comprised of at least one beam reflector positionable to reflect at least some of the angularly diffracted light;

a fourth lens positioned to collimate the plurality of angularly diffracted light signals into a second multi-axis collimated optical signal;

a second wavelength separating medium angularly diffracting light incident to the wavelength separating medium, the wavelength separating medium positioned to have incident thereon the second multi-axis collimated optical signal;

a plurality of sixth cylindrical lenses positioned to focus in the first and the second axis the second multi-axis collimated optical signal.

17. The East-West separable Reconfigurable Optical Add/Drop Multiplexer of claim 16, wherein the first wavelength separating medium is a transmissive grating, and wherein the second wavelength separating medium is a transmissive grating.

18. The East-West separable Reconfigurable Optical Add/Drop Multiplexer of claim 17, wherein the first transmissive wavelength separating medium is operating near Littrow, and wherein the second transmissive wavelength separating medium is operating near Littrow.

19. The East-West separable Reconfigurable Optical Add/Drop Multiplexer of claim 16, wherein the first wavelength separating medium is a reflective grating, and wherein the second wavelength separating medium is a reflective grating.

20. The East-West separable Reconfigurable Optical Add/Drop Multiplexer of claim 19, wherein the first reflective wavelength separating medium is operating near Littrow, and wherein the second reflective wavelength separating medium is operating near Littrow.

21. The East-West separable Reconfigurable Optical Add/Drop Multiplexer of claim 16, wherein the plurality of transmissive beam directors in the first beam director array are positionable in two axes, and wherein the plurality of transmissive beam directors in the second beam director array are positionable in two axes.

22. The multi-channel optical switching system of claim 16, wherein the plurality of transmissive beam directors in the first beam director array are liquid crystal beam steerers, and wherein the plurality of transmissive beam directors in the second beam director array are liquid crystal beam steerers.

23. A method performed by a East-West separable Reconfigurable Optical Add/Drop Multiplexer optically coupled to a plurality of fibers in a first fiber array providing an optical signal, and optically coupled to a plurality of second fibers receiving an optical signal, the method comprising:

collimating a received optical signal in a first axis to form a first single-axis collimated optical signal using at least one of a plurality of first cylindrical lenses;

collimating the first single axis collimated optical signal in a dual axis to form a first multi-axis collimated optical signal using a second cylindrical lens;

angularly diffracting the dual-axis collimated optical signal to form angularly diffracted light using a first wavelength separating medium;

focusing at least some of the angularly diffracted light through at least one of a first plurality of transmissive beam directors in a beam director array and near a first plurality of beam reflectors in a beam reflector array using a third lens;

focusing at least some of the angularly diffracted light through at least one of a second plurality of transmissive beam directors in a beam director array and near a second plurality of beam reflectors in a beam reflector array using an anamorphic relay lens;

directing at least some of the angularly diffracted light using at least one of the first plurality of beam directors and at least one of the second plurality of beam directors;

collimating at least some of the directed angularly diffracted light into a second multi-axis collimated optical signal using a fourth lens;

angularly diffracting the second multi-axis collimated optical signal on a selected optical path to at least one of the plurality of second fibers using a second wavelength separating medium;

focusing the angularly diffracted second multi-axis collimated optical signal in the second axis using a third cylindrical lens;

focusing the angularly diffracted second multi-axis collimated optical signal in the first axis to at least one of a plurality of fourth cylindrical lenses.

24. A method performed by a East-West separable Reconfigurable Optical Add/Drop Multiplexer optically coupled to a plurality of fibers in a first fiber array providing an optical signal, and optically coupled to a plurality of second fibers receiving an optical signal, the method comprising:

collimating a received optical signal in a first axis and a second to form a first multi-axis collimated optical signal using a first lens;

angularly diffracting the dual-axis collimated optical signal to form angularly diffracted light using a first wavelength separating medium;

focusing at least some of the angularly diffracted light through at least one of a first plurality of transmissive beam directors in a beam director array and near a first plurality of beam reflectors in a beam reflector array using a second lens;

focusing at least some of the angularly diffracted light through at least one of a second plurality of transmissive beam directors in a beam director array and near a second plurality of beam reflectors in a beam reflector array using a relay lens;

directing at least some of the angularly diffracted light using at least one of the first plurality of beam directors and at least one of the second plurality of beam directors;

collimating at least some of the directed angularly diffracted light into a second multi-axis collimated optical signal using a third lens;

angularly diffracting the second multi-axis collimated optical signal on a selected optical path to at least one of the plurality of second fibers using a second wavelength separating medium;

focusing the angularly diffracted second multi-axis collimated optical signal in the first axis and second axis using a fourth lens.

25. A method performed by a East-West separable Reconfigurable Optical Add/Drop Multiplexer optically coupled to a plurality of fibers in a first fiber array providing an optical signal, and optically coupled to a plurality of second fibers receiving an optical signal, the method comprising:

collimating a received optical signal in a first axis and a second to form a first multi-axis collimated optical signal using a first lens;

angularly diffracting the dual-axis collimated optical signal to form angularly diffracted light using a first wavelength separating medium;

focusing at least some of the angularly diffracted light through at least one of a first plurality of transmissive beam directors in a beam director array, near a first plurality of beam reflectors in a beam reflector array using a second lens, through at least one of a second plurality of transmissive beam directors in a beam director array, and near a second plurality of beam reflectors in a beam reflector array using a second lens;

directing at least some of the angularly diffracted light using at least one of the first plurality of beam directors and at least one of the second plurality of beam directors;

collimating at least some of the directed angularly diffracted light into a second multi-axis collimated optical signal using a third lens;

angularly diffracting the second multi-axis collimated optical signal on a selected optical path to at least one of the plurality of second fibers using a second wavelength separating medium;

focusing the angularly diffracted second multi-axis collimated optical signal in the first axis and second axis using a fourth lens.

* * * * *